(12) United States Patent
Barr

(10) Patent No.: US 6,389,470 B1
(45) Date of Patent: May 14, 2002

(54) TELECOMMUNICATION CONTROLLER MESSAGING SYSTEM USING MIDDLEWARES TO DECOUPLE APPLICATIONS FROM SYSTEM RESOURCES

(75) Inventor: Stuart Barr, Clare (IE)

(73) Assignee: Tellabs Research Limited, Shannon (IE)

(*) Notice: Subject to any disclaimer, the term of this patent is extended or adjusted under 35 U.S.C. 154(b) by 0 days.

(21) Appl. No.: 09/615,066

(22) Filed: Jul. 12, 2000

Related U.S. Application Data

(63) Continuation of application No. PCT/IE98/00108, filed on Dec. 15, 1998.

(30) Foreign Application Priority Data

Jun. 17, 1998 (IE) .................................. 980475
Aug. 31, 1998 (IE) ............................... S980714

(51) Int. Cl.[7] .......................................... G06F 15/173
(52) U.S. Cl. ...................... 709/226; 709/223; 709/225; 709/229
(58) Field of Search ................................. 709/200, 204, 709/206, 205, 223, 202, 224, 225, 226, 229; 345/326, 333; 375/200.06, 800, 200.02, 200.09

(56) References Cited

U.S. PATENT DOCUMENTS

| | | | | |
|---|---|---|---|---|
| 5,678,006 A | * | 10/1997 | Valizadeh et al. | 709/223 |
| 5,740,362 A | * | 4/1998 | Buickel et al. | 709/201 |
| 6,058,426 A | * | 5/2000 | Godwin et al. | 709/229 |
| 6,080,202 A | * | 6/2000 | Strickland et al. | 703/27 |
| 6,128,657 A | * | 10/2000 | Okanoya et al. | 709/224 |
| 6,182,153 B1 | * | 1/2001 | Hollberg et al. | 709/315 |
| 6,219,711 B1 | * | 4/2001 | Chari | 709/232 |

OTHER PUBLICATIONS

Heite et al, International DCE Workshop, "Extending DCE RPC by Dynamic Objects . . . ", pp. 214–228, Oct. 7, 1993.

Bindu Rama Rao, Data Communications, vol. 24, No. 12, "Making the Most of Middleware", pp. 89–90, 92, 94, 96, Sep. 1, 1995.

\* cited by examiner

*Primary Examiner*—Zarni Maung
*Assistant Examiner*—Wen Tai Lin
(74) *Attorney, Agent, or Firm*—Jacobson Holman, PLLC

(57) ABSTRACT

In a telecommunication controller (1), a messaging system allows real time communication between sub-systems such as a main controller (2) and line cards (3). Requesting application (5) create a proxy (12) which controls the function call via a middleware engine (11) in each of the sub-systems (2,3). A resource middleware engine (11) calls a server (13) which in turn controls performance of the function on the resource (10). The proxies (12) are transient. The servers (13) are static but may be easily added or deleted according to resource changes. Applications (5) and resources (10) are decoupled from the messaging system.

13 Claims, 18 Drawing Sheets

TELECOMMUNICATION CONTROLLER MESSAGING SYSTEM USING MIDDLEWARES TO DECOUPLE APPLICATIONS FROM SYSTEM RESOURCES

This application is a continuation of PCT/IE98/00108 filed Dec. 15, 1998.

BACKGROUND OF THE INVENTION

1. Field of the Invention

The invention relates to a messaging system for a telecommunication controller operating in real time and which comprises multiple distributed sub-systems such as a main controller and multiple line cards. The invention relates particularly to such systems which include a number of circuits having embedded software.

2. Prior Art Discussion

Heretofore, the approach for messaging within such systems has been to provide dedicated communication protocols tied into hardware buses and interface circuits in order to achieve real time performance. Such an approach has been satisfactory for many situations.

However, in recent years there has been a growing requirement for telecommunication controllers to have inherent flexibility to allow modification. Such modification is required both to change the functionality of the system and also to allow growth in cater for ever-increasing transaction volumes. Messaging protocols which are bound to the higher-level and lower-level functionality tend to inhibit the ability to modify telecommunication controllers.

OBJECTS OF THE INVENTION

It is an object of the invention to provide a messaging system for a telecommunication controller which allows simple modification of resources which perform telecommunication functions and of application which control and request the functions.

A development of this object is to decouple the messaging system from the applications and resources so that they may be modified independently of the messaging system.

Another object is to achieve this flexibility without affecting response time so that real time performance is still achieved.

SUMMARY OF THE INVENTION

The invention provides a messaging system in a telecommunication controller comprising a plurality of distributed sub-systems, the messaging system comprising:

means in a requesting sub-system for creating a proxy to control messaging for a function to be carried out in real time by a resource on a resource sub-system, the function being requested by an application on the requesting sub-system;

a middleware engine in the requesting sub-system comprising means for acting in response to the proxy in real time to generate a function request message and to transmit said message to the resource sub-system;

a middleware engine in the resource sub-system comprising means for reading the message, determining a server associated with the function, and activating the server;

means in the server for controlling performance of the function by the resource;

means in the resource middleware engine for passing control back to the proxy when the function is complete; and means in the requesting sub-system for terminating the proxy when the requesting application is satisfied.

Preferably, each middleware engine comprises means for operating as a requesting or at a resource middleware engine whereby function requests are bi-directional.

In one embodiment, the sub-systems comprise a main system controller and a plurality of line cards.

In another embodiment, the requesting application comprises means for creating the proxy and for terminating the proxy.

In one embodiment, the proxy is an instance of a proxy object class.

Preferably, the server is an instance of a server object class.

In one embodiment, the server is stored in non-volatile memory.

In another embodiment, the requesting middleware engine is coupled to the application only via the proxy, whereby the application may be created or modified independently of the middleware engine.

In a further embodiment, the resource middleware engine is coupled to the resource only via the server, whereby the resource may be created or modified independently of the middleware engine.

Preferably, the server registers automatically with the resource middleware engine.

In a further embodiment, the servers for both active and redundant resources register with the resource middleware engine to provide automatic redundancy.

Preferably, the requesting application comprises means for creating the proxy by presenting a logical or a physical key for the resource and the function. In one embodiment, the message includes the key function parameter arguments.

In a further embodiment, the proxy controls one of a plurality of types of message transactions, including a synchronous type in which the function is invoked, a response is awaited and a return value is passed to the requesting application, and a synchronous type in which the function is invoked only.

In another embodiment, the proxy controls a deferred synchronous transaction in which a function is invoked, a reply is transmitted and an application retrieves the reply later.

In one embodiment the proxy initiates multiple re-tries upon failure of the requested function.

In another aspect, the invention provides a telecommunication system comprising a messaging system as claimed in any preceding claim.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
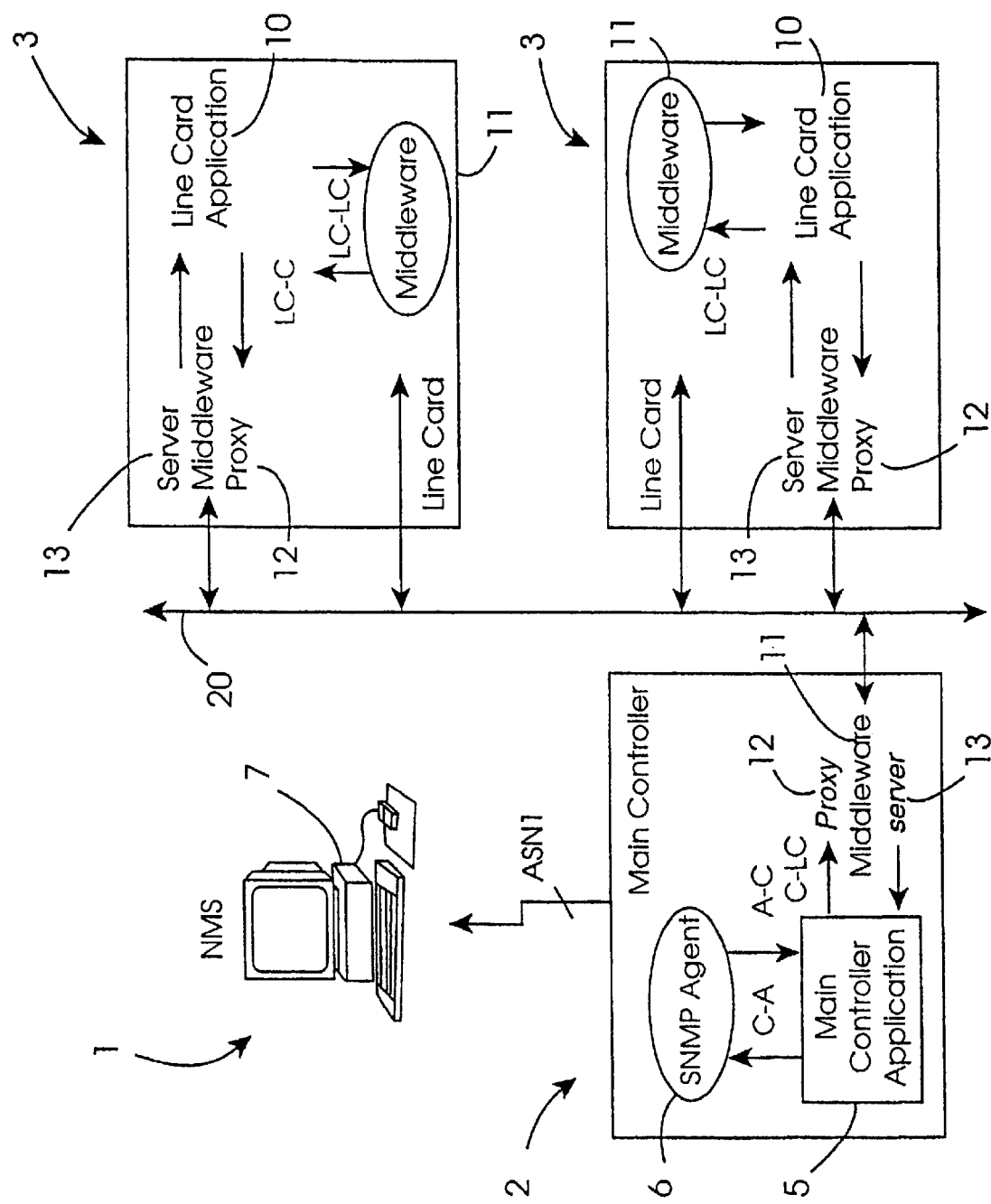
FIG. 1 is a diagrammatic representation of a telecommunication controller messaging system and interaction with applications and resources of the controller.

Referring initially to FIG. 1, a messaging system in a controller 1 is initially briefly described. The controller 1 comprises a main controller 2 and line cards 3. The main controller 2 comprises a main controller application 5 and a SNMP agent 6 interfacing with a management station 7. The main controller 2 also comprises a middleware engine 11 which interacts with the application 5 via proxies 12. The middleware engine 11 communicates via a message handling layer and a physical layer indicated generally by the numeral 20 with corresponding middleware engines 11 in the line card 3. The middleware engine 11 of each line card 3 is coupled to a line card application 10 via servers 13. In addition, there is an IDL interface between the line card application 10 and the middleware engine 11 to allow line card to line card communication. In this interface, the proxies and the servers are not explicitly illustrated, for clarity.

The servers 13 are registered in a generic fashion to the middleware engine, and not by a form of hard coding. This ensures that the middleware engine does not need modification on creation of additional servers.

The controller centric IDL interfaces involve use of a middleware engine 11 in a requesting sub-system and a middleware engine 11 in a resource sub-system. Each middleware engine 11 includes functionality to provide bi-directional function calls. However, for the purposes of this description, the terms "requesting middleware engine" and "resource middleware engine" are used to indicate the roles they are playing for a particular function call.

The messaging system comprises the middleware engine 11 in each of the sub-systems 2 and 3, the server objects 13 (which are stored in room-volatile memory), and functionality in applications for creating proxies. The proxies and the servers are both instances of object classes. However, the proxies are transient in nature as they exist only during a particular function call, while the servers are permanent as they are associated with resources rather than particular function calls.

Referring again to FIG. 1, as the controller application 5 requests a function on a resource of a remote line 3, a proxy is created by the application. The proxy is an instance of a proxy object class. The proxy is created by presenting a logical or a physical key which identifies the server. The proxy takes over control of the function call and requests a message to be sent via the middleware engine 11 to the remote line card 3 which supports the requested services. The resource middleware engine determines the server 13 to be called and passes the operation on to that server. The server 13 then calls the real resource functionality by calling the local function. On completion, the server 13 returns data to the invoking proxy, which in turn returns control to the requesting application. When the application has completed the operation, the proxy is terminated.

Many advantages will be apparent from this construction of message system. One such advantage is the fact that there is very little memory or processing overhead in the requesting sub-system because the proxies are transient and exist only during the function call. This helps to achieve real time performance in an embedded environment, traditionally limited by memory and processing power. Another major advantage is the fact that the requesting application is only coupled to the middleware engine via the proxies. The application creates the proxy and the proxy then takes over control by directing the middleware engine to transmit the function request message. Therefore, the requesting applications may be modified, deleted or added independently of the middleware engine. Likewise, the resource middleware engine is only coupled to the resources via the server objects 13. The server objects 13 automatically register with the middleware engine. Therefore, the resources may be modified, added or deleted independently of the resource middleware engine.

The requesting application does not need to know what redundancy is provided and which is the currently active resource. This level of functionality is achieved automatically by virtue of the proxy-creating key identifying a logical or physical address, and multi-casting of the message by the middleware engine to all line cards.

The requesting application only needs to identify a resource key to create the proxy. This may be a logical key for logical resources. An example of a situation in which logical keys are used is generation of a local alarm in a line card. A physical key would be used, for example, to set a performance threshold for a particular line card. The proxy avoids message handling overhead in the requesting application by automatically controlling the function call and performing actions such as automatically re-trying the call if failures arise.

Three types of transactions may be involved for a function call. These are synchronous, asynchronous, and deferred synchronous. For a synchronous transaction, the function is invoked, the server waits until the function has been performed, and the server transmits a return value to the requesting proxy. For an asynchronous transaction, the function is invoked only and no further action arises. For a deferred synchronous transaction, the function is involved by the application creating the proxy and the middleware returning immediately to the application.

The application can later query the middleware response, for example, upon expiry of a timer.

Figure 2:
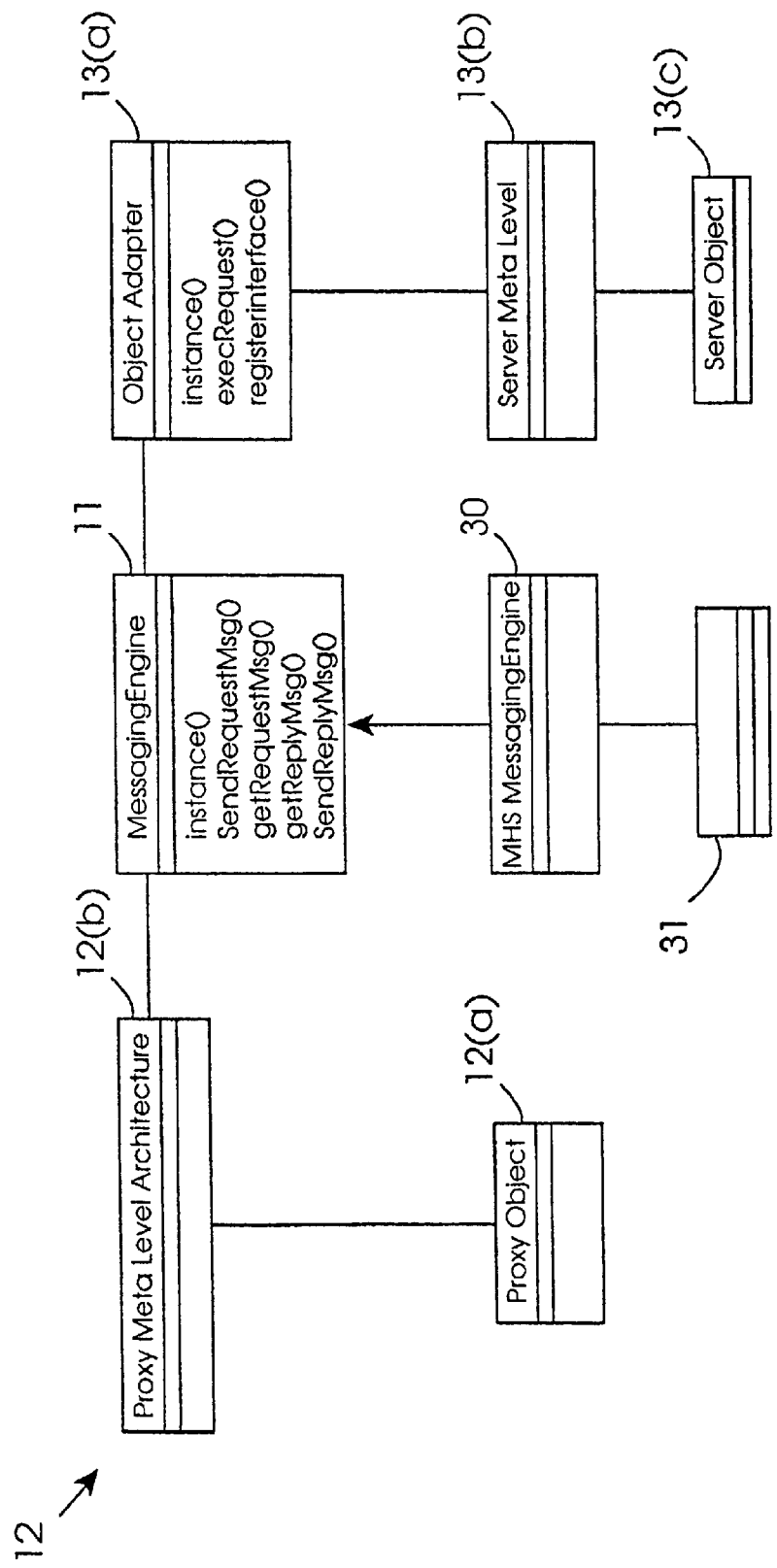
FIGS. 2 to 5 inclusive are diagrams illustrating messaging system components.

Referring now to FIGS. 2 to 5, the mechanisms behind the messaging system are described in more detail. The proxy 12 comprises a proxy object 12(a) and a meta level architecture 12(b). The messaging engine 11 is connected to a lower level message handling system (MHS) 30, in turn connected to a physical layer 31 for message transfer. The server 13 comprises an object adapter 13(a), ameta level 13(b), and an object 13(c). In FIG. 2, the requesting and resource middleware engines 11 are combined in the one box for illustrative purposes.

Figure 3:
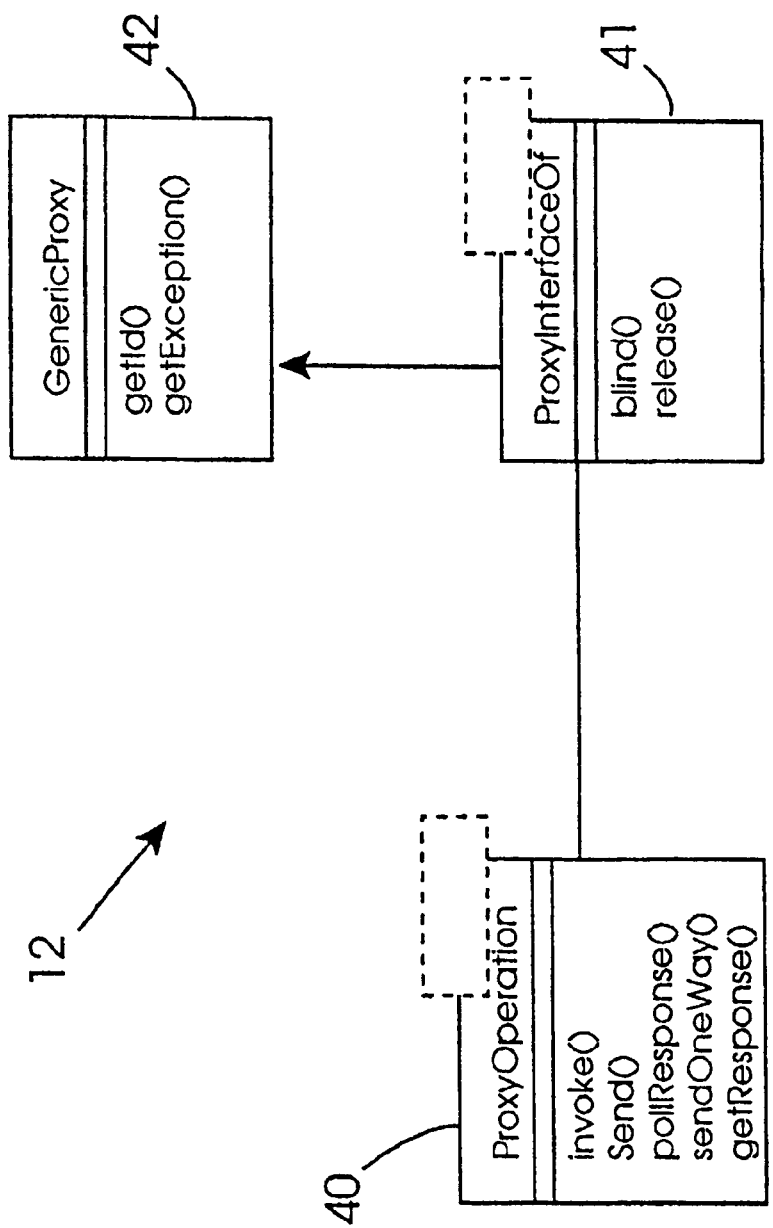

As shown in FIG. 3, the proxy comprises operation, surface and generic components 40, 41 and 42 at the meta level.

Figure 4:
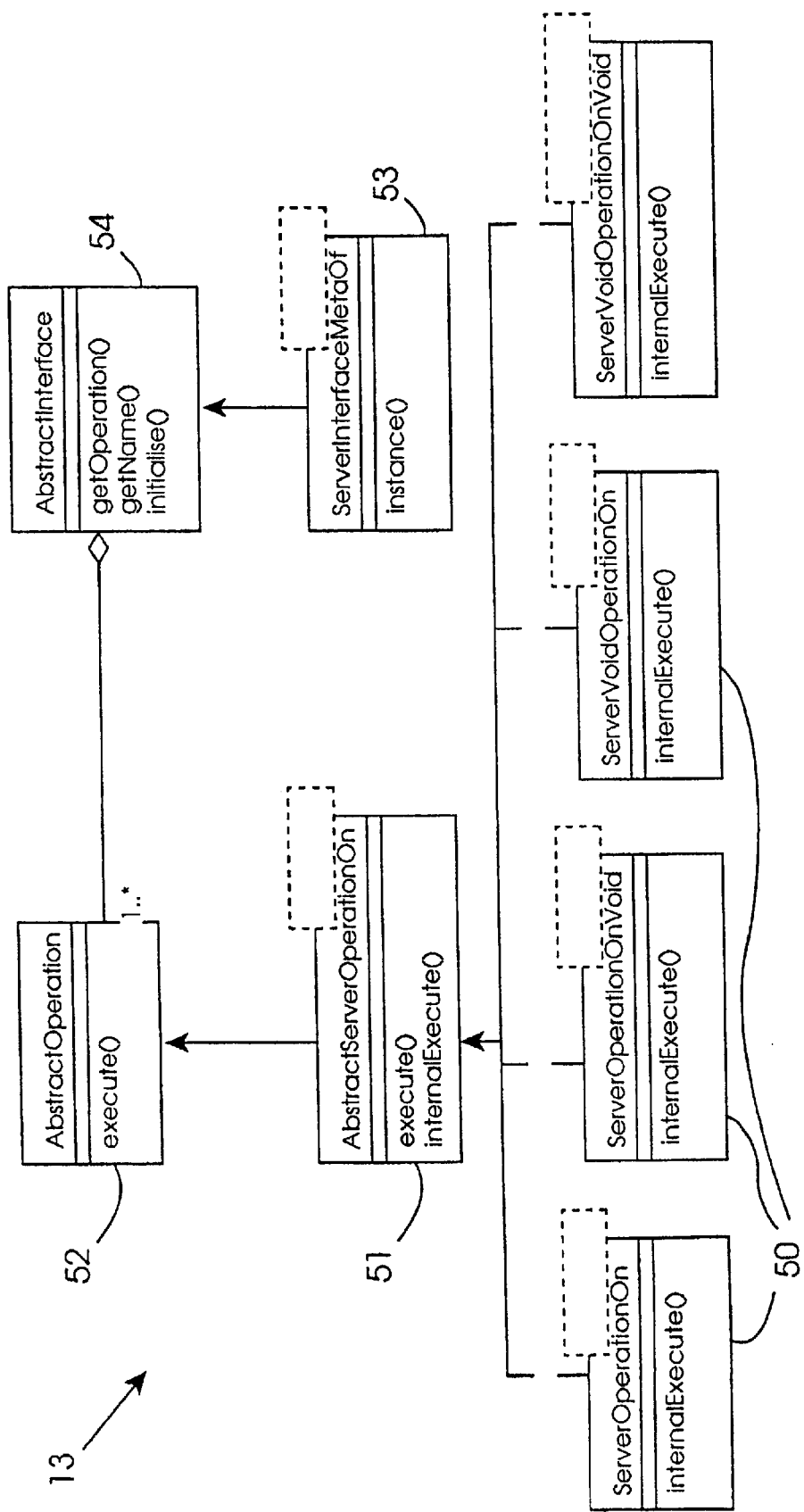

As shown in FIG. 4, the server 13 comprises void-related components 50, operation-related components 51 and 52, and interface-related components 53 and 54.

Figure 5:
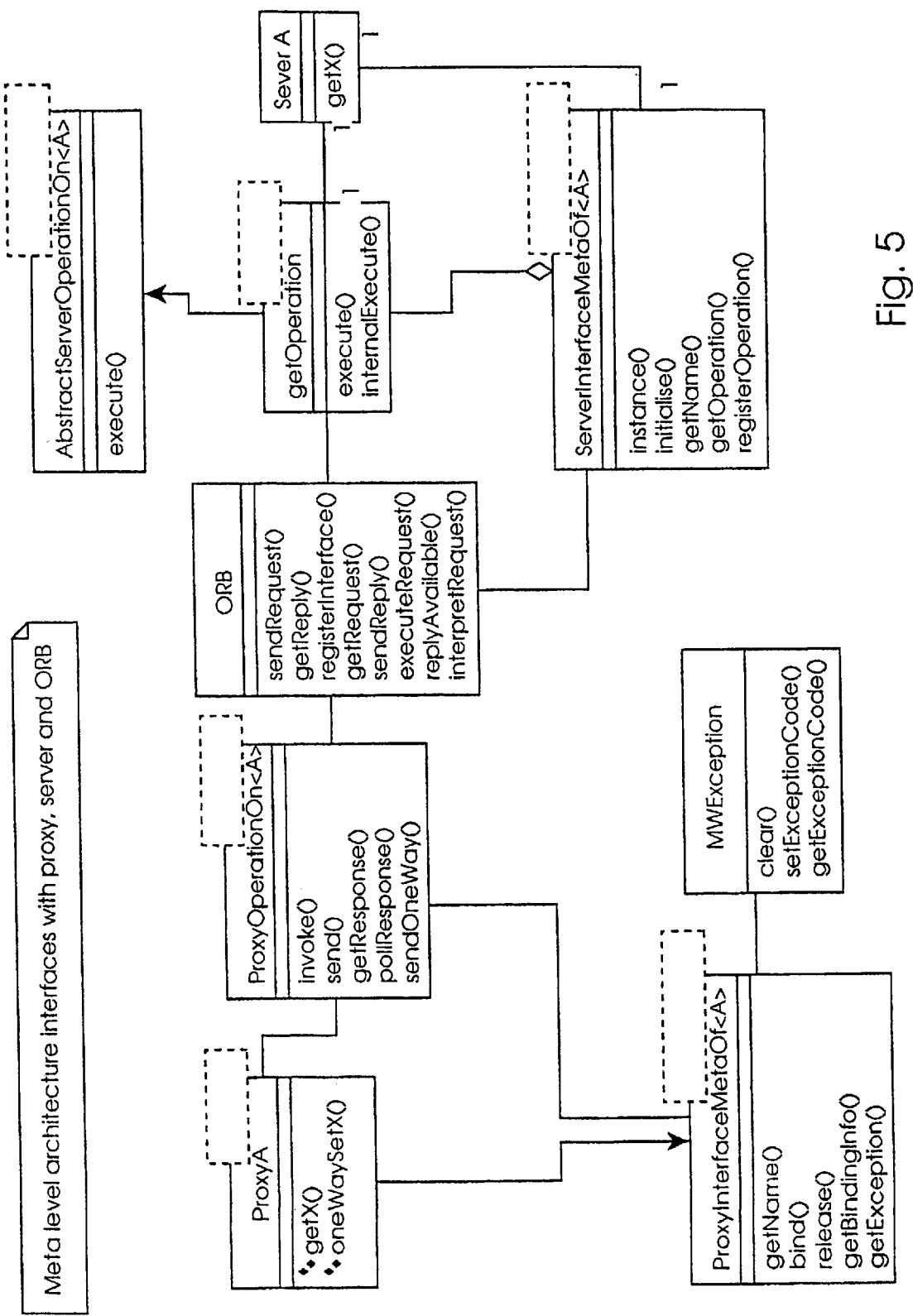
Figure 6:
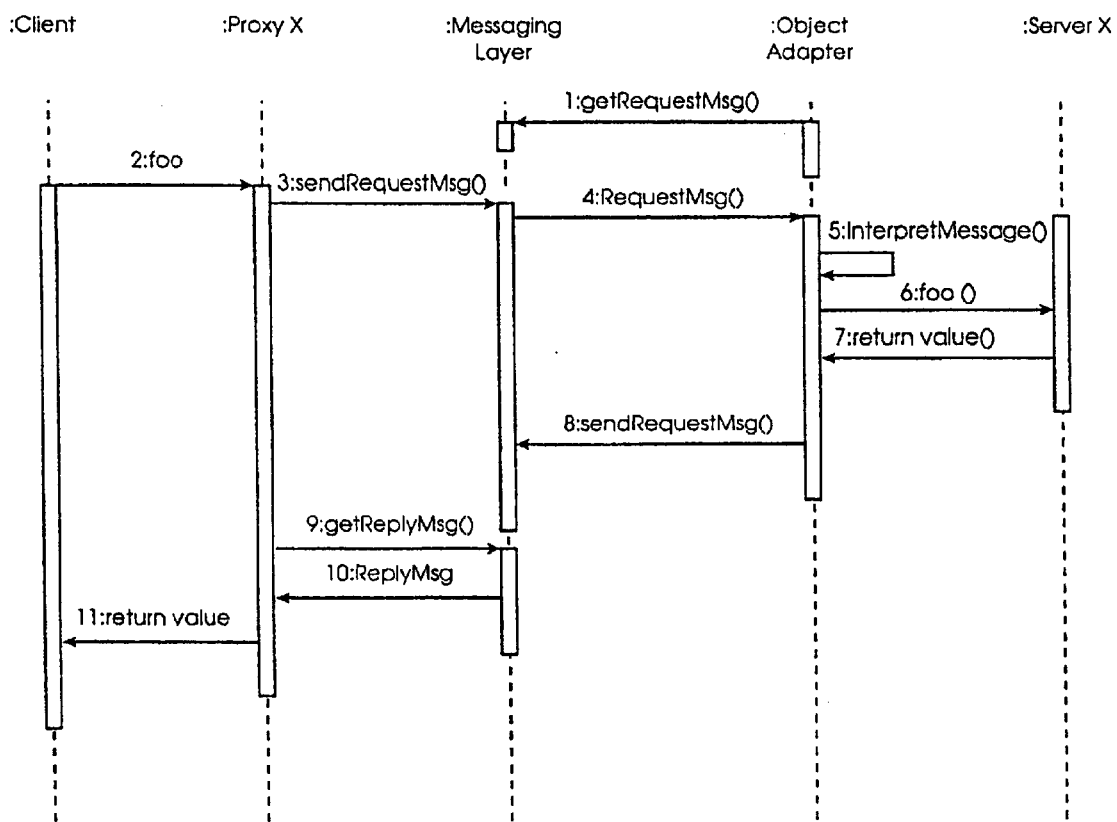
FIGS. 6 to 18 inclusive are message flow diagrams illustrating operation of the messaging system.
Figure 17:
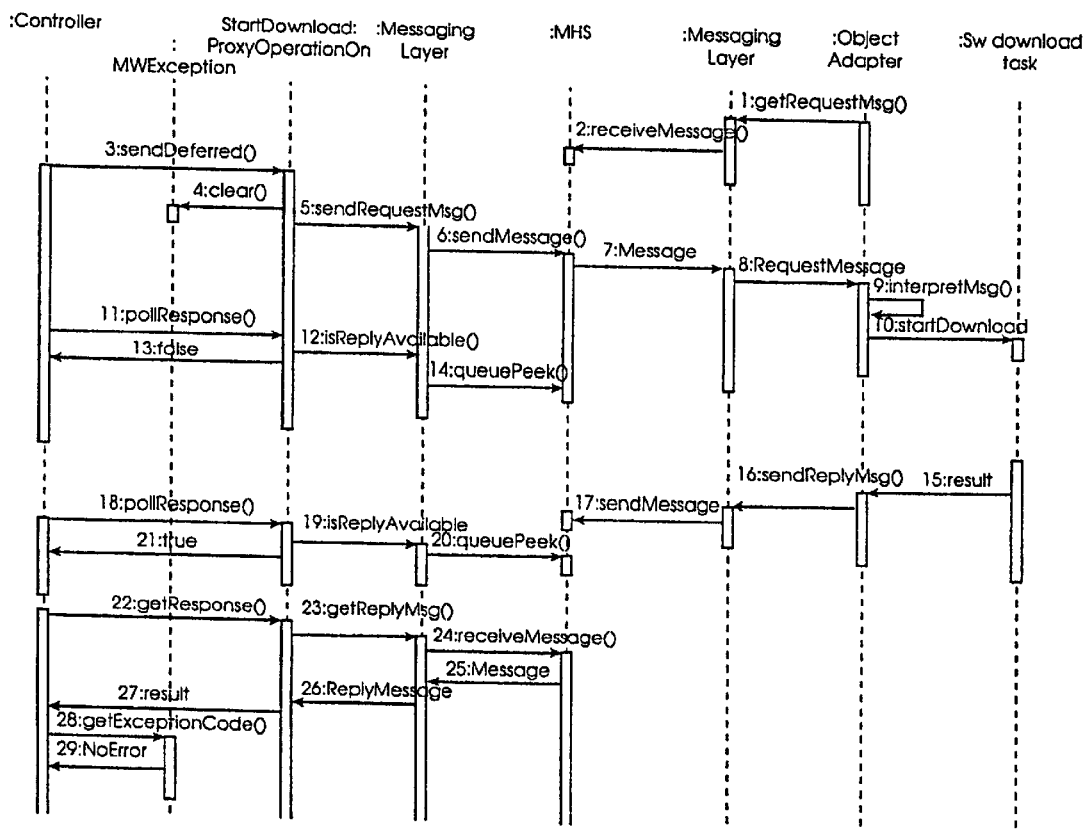
Figure 18:
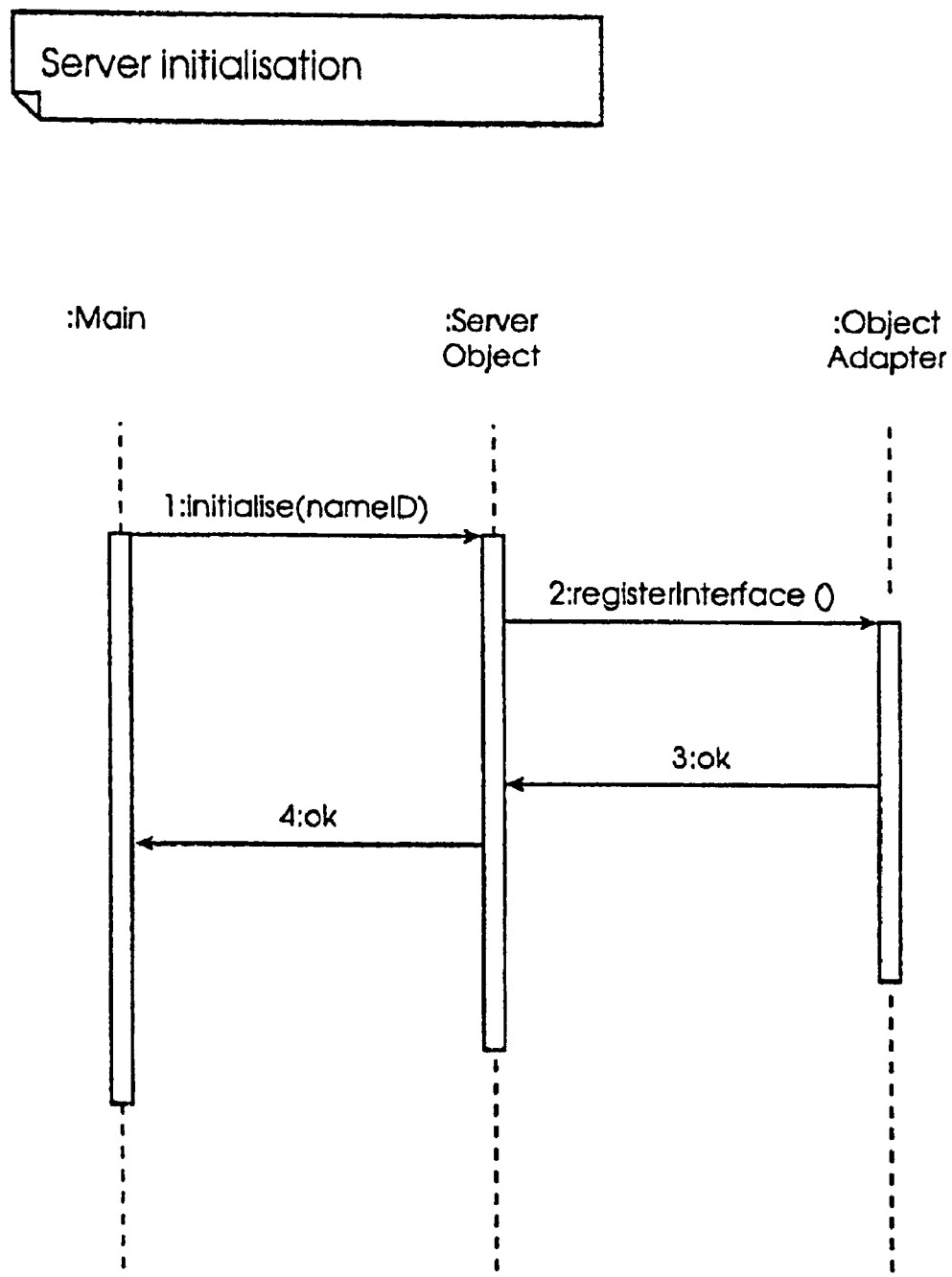

FIG. 5 is a middleware static model associated with the dynamic model sequence diagrams of FIGS. 6 and 18. Referring now to FIGS. 6 to 18, examples of function calls are illustrated. These demonstrate the synchronous, asynchronous, and deferred synchronous transaction types.

FIG. 6 shows a synchronous call for the method foo, which is a synchronous operation. The proxy does not return until the server completes and returns a result to the proxy. The sequence is as follows.

The requesting application instructs the system 1 to create a proxy X.

The client calls the function foo on the proxy X.

The proxy X packages the request as a message and transmits it through to the object adapter which interprets the message and calls function foo on the server X using the server object.

The return value of foo is passed back to the object adapter which sends the results to the proxy X as a message.

The proxy X interprets the message and returns the result as the return value from function foo.

A deferred synchronous call may also be made. For example the client may invoke the method longfoo on server X without waiting for the remote server to execute and return a reply. This allows the client to perform other tasks in the interim, checking periodically in a non-waiting mode for a reply.

Figure 7:
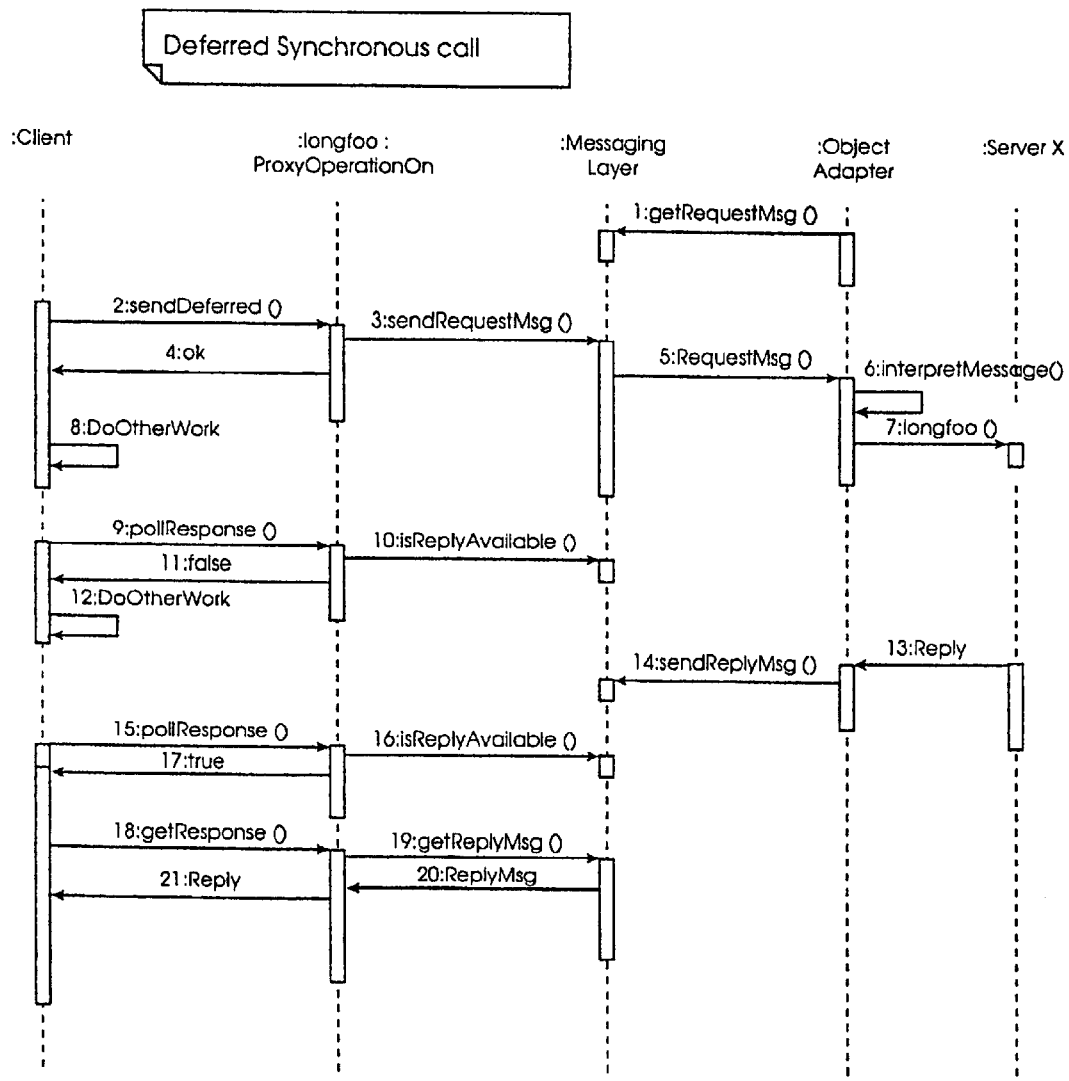

As shown in FIG. 7, the client creates a ProxyOperationOn proxy, specifying that it is on the operation longfoo. The client calls the method sendDeferred, passing it the required parameters, if any. This method packages the request as a message and transmits it through to the object adapter, stores the handle internally, and returns to the client. The client calls pollResponse on the ProxyOperationOn object. This in turn calls isReplyAvailable on the middleware engine, but since no reply is available yet, this returns false. The object adapter interprets the message and calls the function longfoo on the server X. The result of longfoo is passed back to the object adapter which sends the result in the proxy X via a message. The client calls pollResponse on the ProxyOperationOn object, this time returning true. The response is then retrieved and interpreted by the client.

Figure 8:
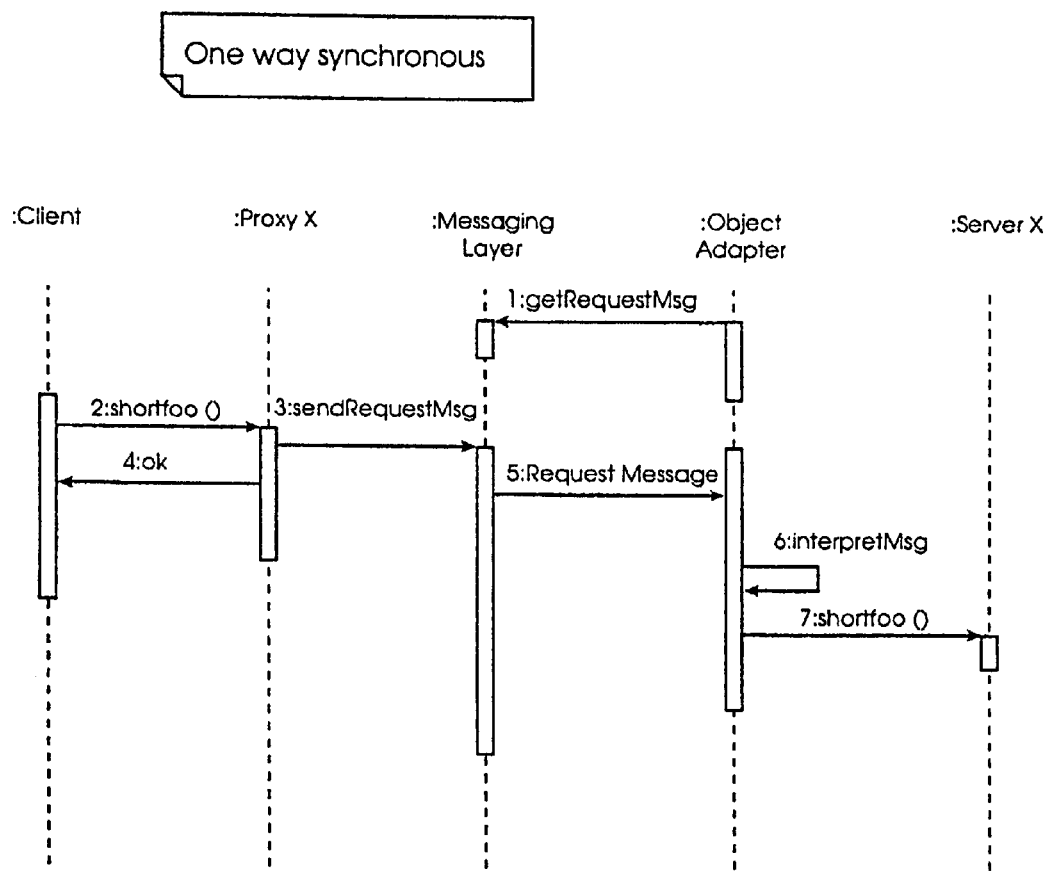

One way requests are also handled by the system. The method shortfoo is a one way operation. This method is called on the proxy X as shown in FIG. 8. The proxy X packages the request as before and transmits it through to the object adapter. The function shortfoo on the proxy X returns immediately, the object adapter interprets the message and calls the function shortfoo on the server X. The object adapter does not send a reply as it knows that the method is one way.

Figure 9:
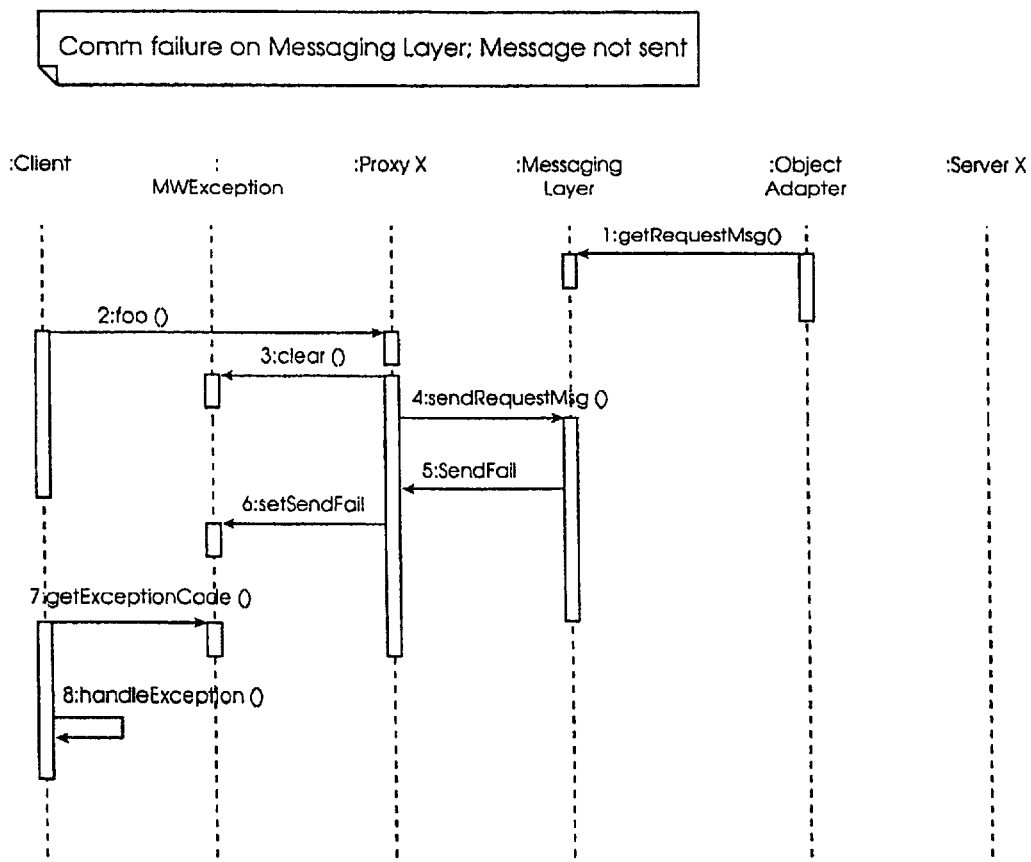

FIG. 9 shows the situation in which a message is not sent from the message layer. In this case the proxy clears the proxy's exception object. After attempting to send the message failure is encountered, upon which the failure is passed back to the proxy. The proxy interprets this as SendFail and sets the exception object. The proxy method returns a reply, and the client checks the proxy's exception object and detects the exception, and handles it in the appropriate manner.

Figure 10:
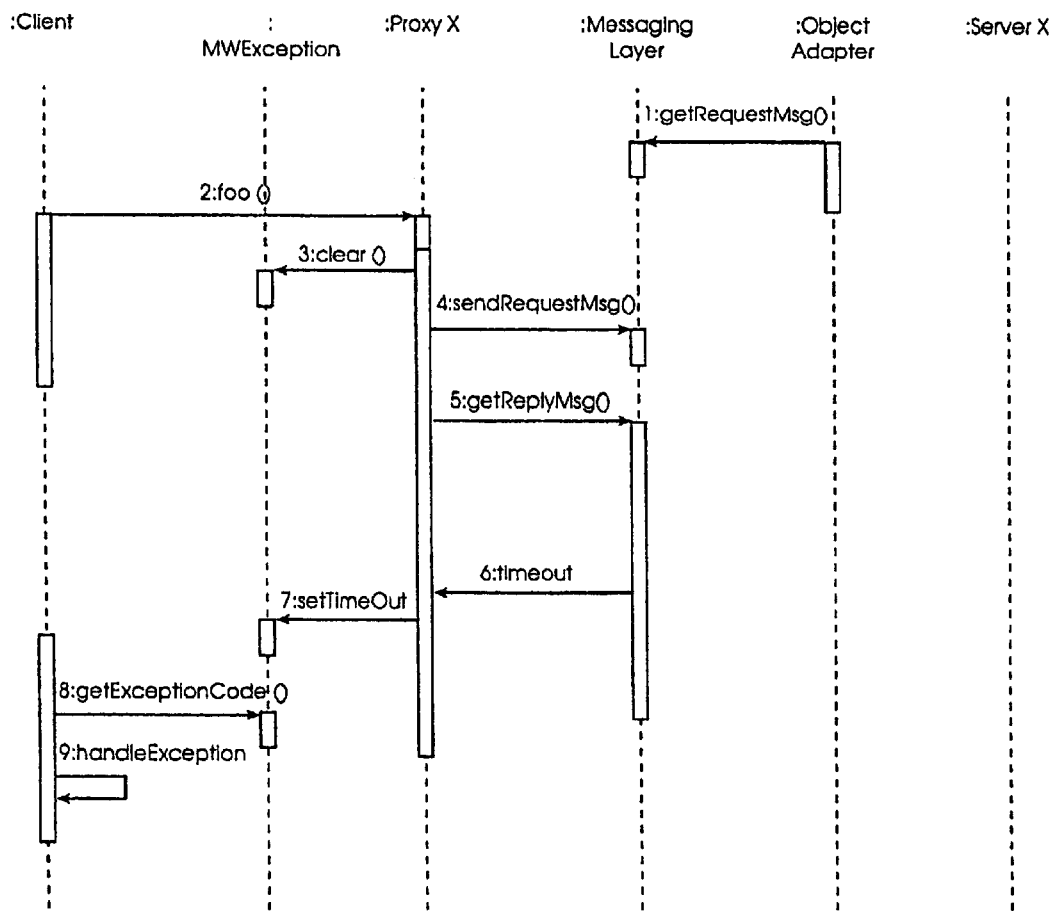

The system also handles situation where a message is sent but not received as shown in FIG. 10. In this case, after the operation executes and returns true the message is never received at the destination. The proxy awaits a response and times out. This is interpreted as a time-out and the exception object is set. This allows the client to detect the exception and handle it as appropriate.

Figure 11:
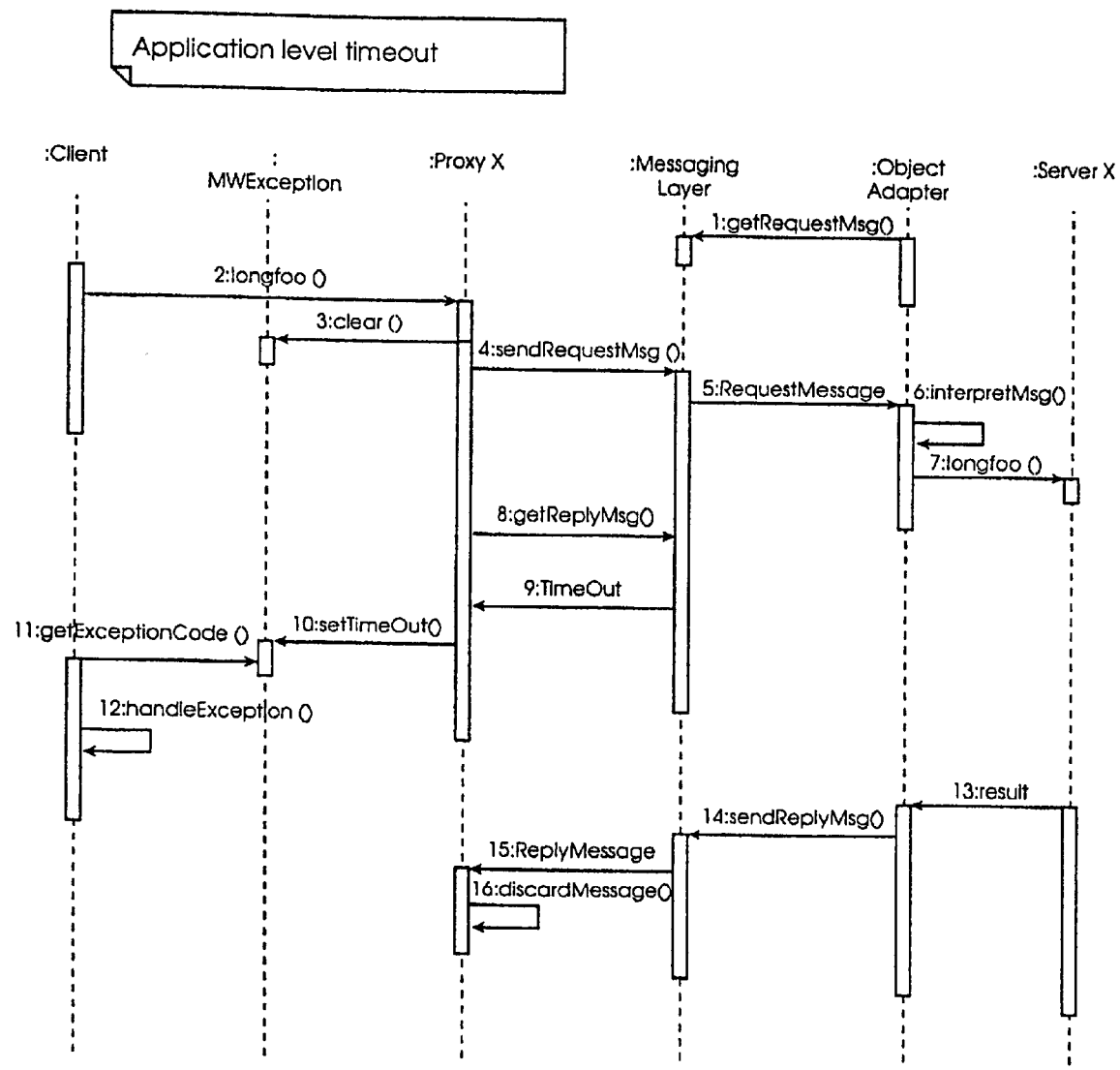

FIG. 11 illustrates the situation in which a message is sent and received, but the client times-out while waiting. Such a scenario may arise if the duration of a remote operation is unpredictable, or if the remote server is busy. Clearly, the deferred synchronous mechanism should be used if it is anticipated that a time-out may arise. As shown in FIG. 11, while the object adapter calls longfoo on server X the proxy has executed a getReplyMag to retrieve the replay from the server but times out waiting for a reply. The proxy sets the exception object with a timeout and the method returns. The client checks the proxy's exception object 11, detects the exception, and handles it. Later, longfoo has completed and returns a reply indicating successful completion, but the message is discharged by the messaging layer.

Figure 12:
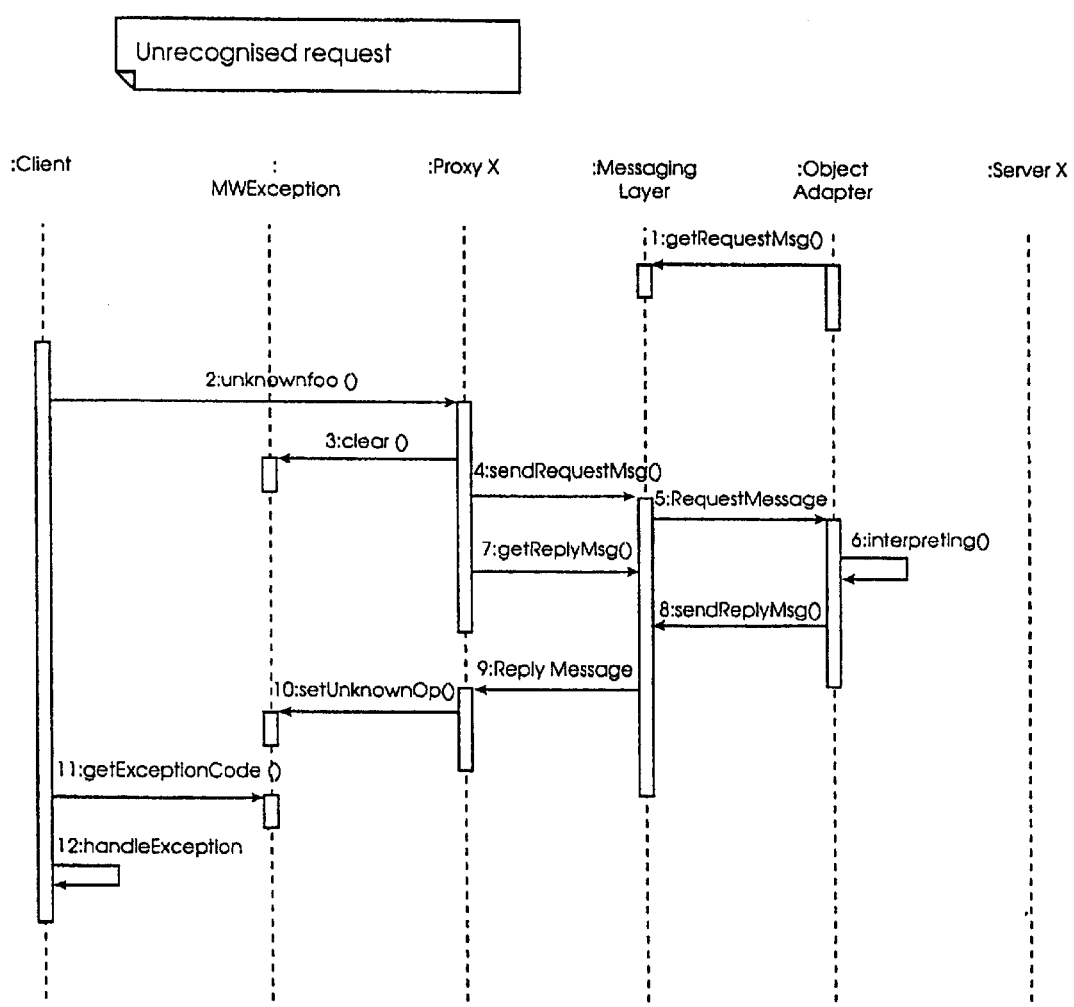

Referring now to FIG. 12, a situation is shown in which the target operation is not recognised. In this case, the object adapter fails to interpret the message and a reply indicating this is sent to the proxy. The proxy receives the Replymessage from the messaging layer, retrieves the exception information and sets the proxy's exception object. This allows the client to handle it.

Figure 13:
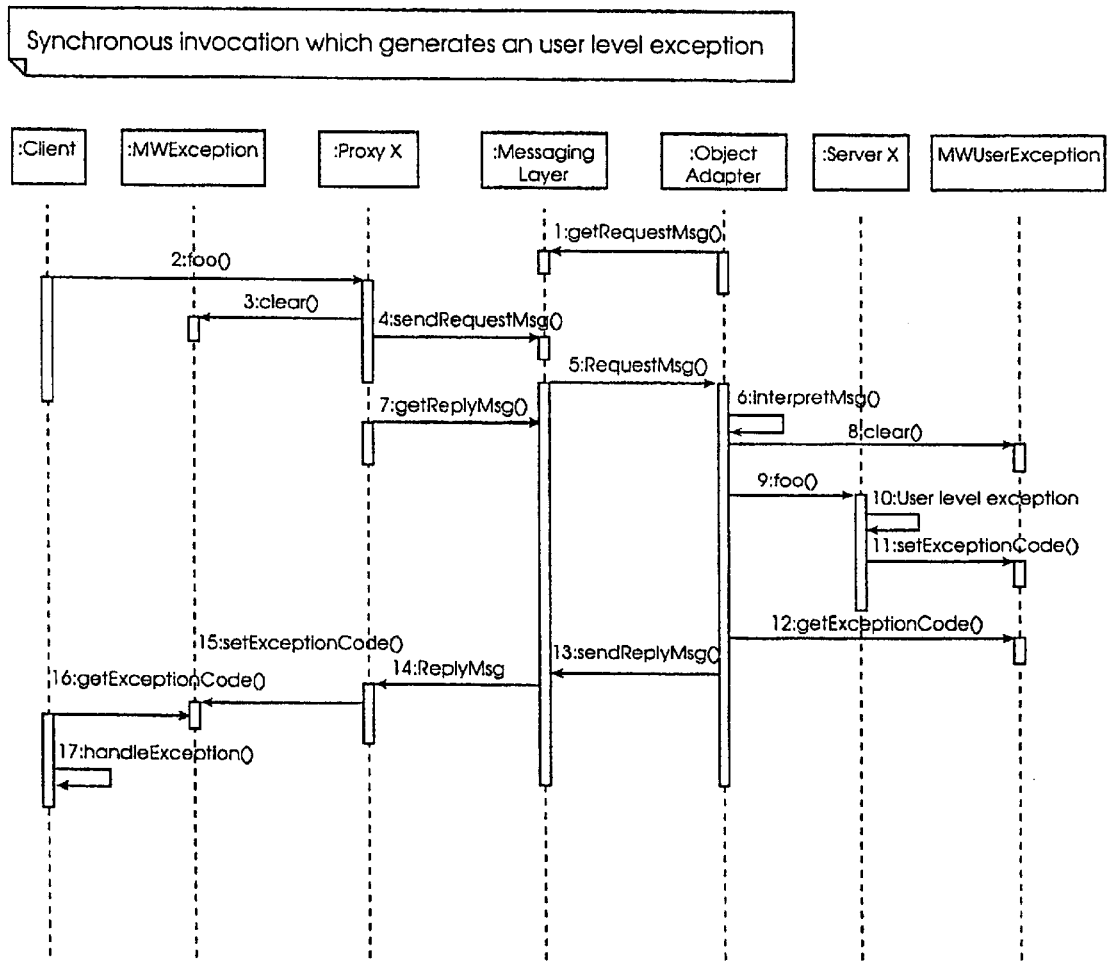

FIG. 13 shows the sequence if the server operation fails. In this example the method foo is called. When the failure occurs, the foo method retrieves the UserException object and sets an error status, causing the object adapter to in turn send a message indicating a user level failure. The proxy in turn sets the exception object 11, again allowing the client to handle the failure.

Figure 14:
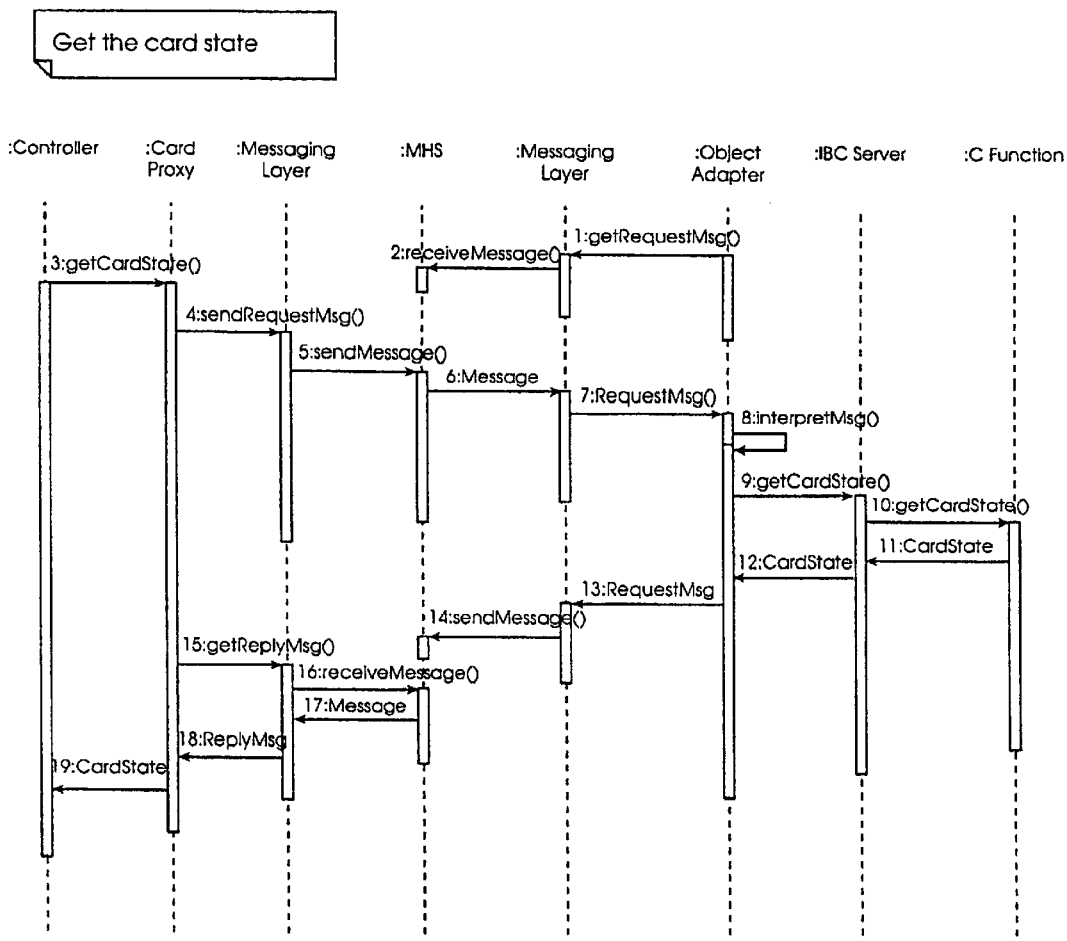

As described above, the messaging system interacts between an application level and a message delivery layer. FIG. 14 shows a situation in which a client determines a card state. The client calls getCard on a Card proxy. The system operates as described above until the getCard method is invoked on the server object supporting the requested interface. This method calls a C function which returns the actual card state to the object adapter. This is packaged as a method and sent back to the proxy object, which interprets the message and returns the card state to the client.

Figure 15:
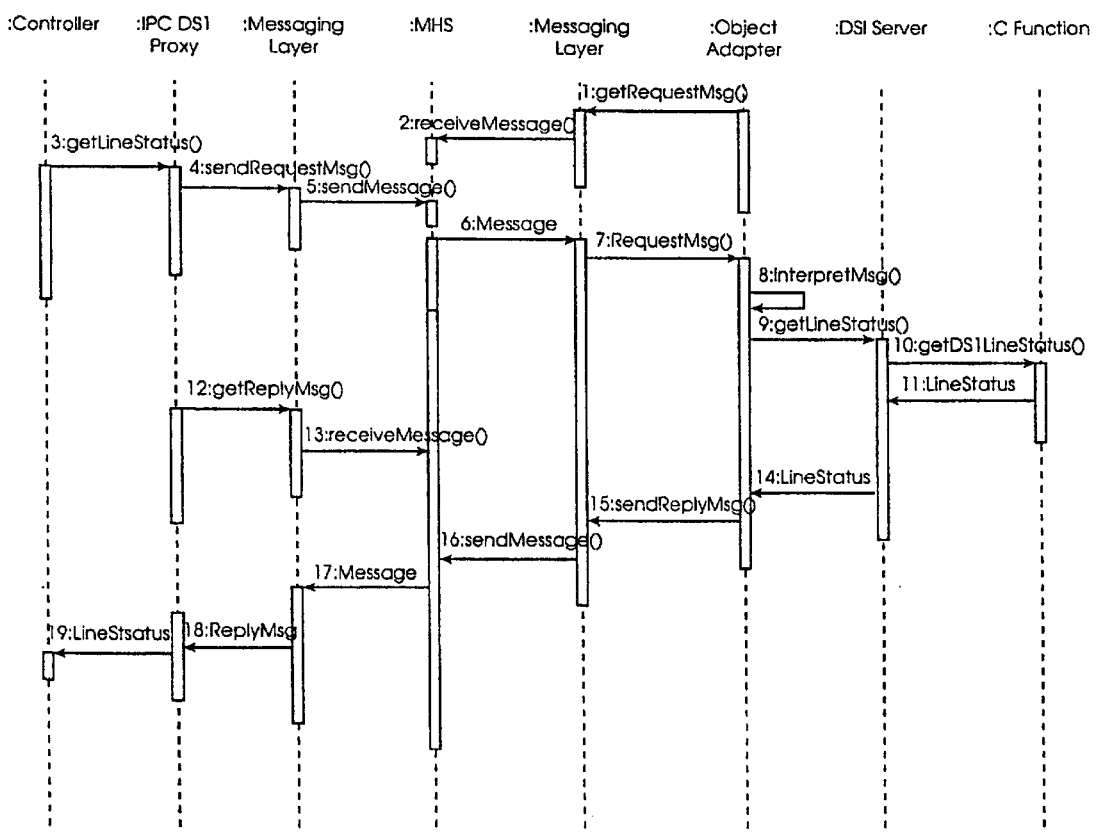

FIG. 15 shows a sequence to determine the line status of a physical termination of a DS1 card (physical transmission medium). In this case a DS1 proxy is used and the object adapter locates the DS1 server object and calls its gelLineStatus method. The DS1 proxy subsequently receives the reply.

Figure 16:
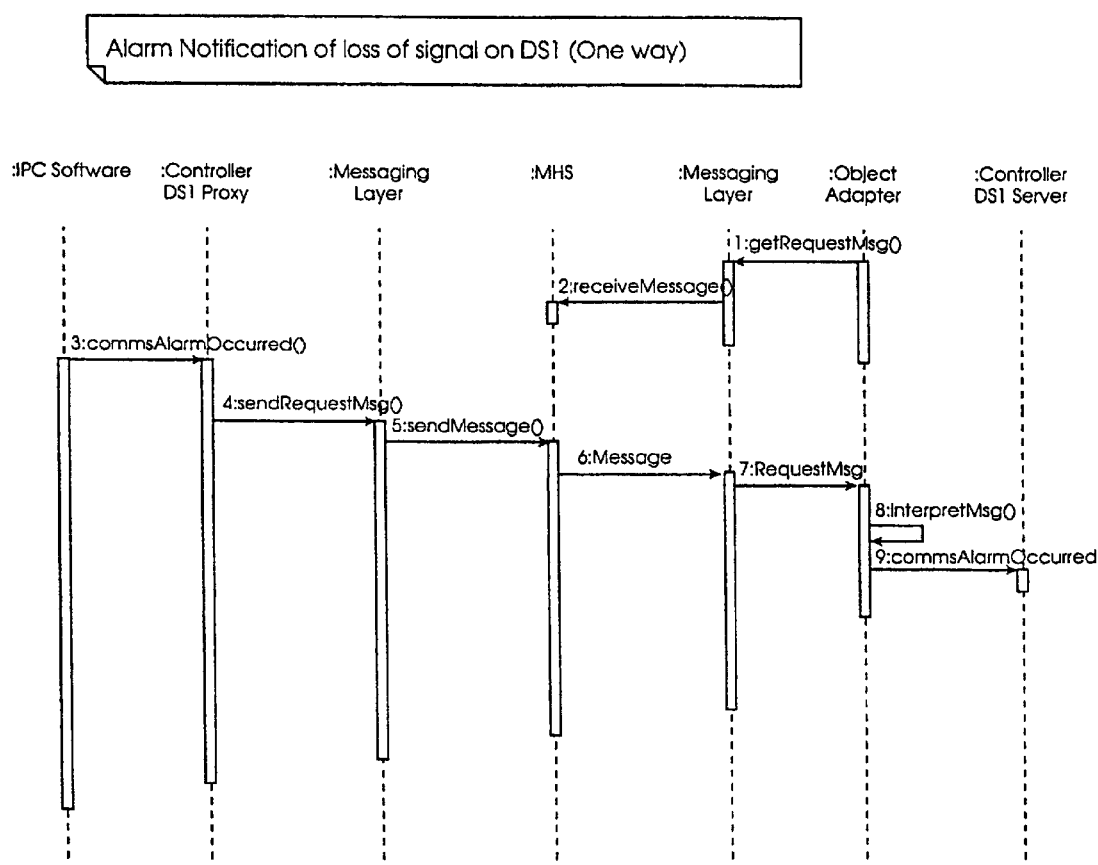

FIG. 16 illustrates a situation in which an alarm notification and loss of signal on DS1 is transmitted. This is a one-way operation. The IPC software detects a loss of signal on the DS1 line, and retrieves the controller DS1 proxy and calls the commsAlarmOccured method on the proxy, passing it the port identifier. After its operation, the proxy returns without a reply. The commsAlarmOccured method is invoked on the Controller DS1 server.

The deferred synchronous method may be used for a software download, as shown in FIG. 17. The client creates a ProxyOperationOn object, specifying that it is on the operation startDownload. The client calls the method sendDeffered, passing it the required parameters. After the request is packaged as a message, the message handle is stored by the ProxyOperationOn object and this in turn calls is ReplyAvailable on the messaging layer. As no replay is available, this returns false. On the target card, the software download task has completed and the result is returned to the object adapter which sends a reply message back to the controller containing the result. The controller again calls pollResponse in the ProxyOperationOn object, this time returning true. The controller then calls getResponse. This gets the returned message, checks for an error code in the reply, extracts the result and returns it to the controller. The controller checks the exception object to see if an exception occurred, but finds it clear, indicating that the result is valid.

Finally, referring to FIG. 18 initialisation of a new card is illustrated. An initialised method on the server object is called and it is passed a string through which it can identify itself to the object adapter. The card software processes the generic method initialise (nameID) on the server object. The server object stores the nameID and calls the registerInterface method on the object adapter, and passes itself to it. This makes the object adapter aware of its presence and allows requests to be passed to it. The object adapter indicates whether or not registration was successful.

It will be appreciated that the invention provides real time message transfer in a telecommunication controller in a manner in which allows flexibility in design and modification of the controller itself. This, for example, allows addition of new functionality, and also expansion of resources to perform existing functionality.

The invention is not limited to the embodiments described but may be varied in construction and detail within the scope of the claims.

What is claimed is:

1. A messaging system in a telecommunication controller having a plurality of distributed sub-systems, the messaging system comprising:

means in a requesting sub-system for creating a proxy to control messaging for a function to be carried out in real time by a resource on a resource sub-system, the function being requested by an application on the requesting sub-system, said proxy creating means having means for including a logical key identifying a server type for a server to control implementation of the function;

a middleware engine in the requesting sub-system including means for acting in response to the proxy in real time to generate a function request message and to transmit said message to the resource sub-system, wherein the requesting middleware engine is coupled to the application only through the proxy, the message includes the logical key and function parameter arguments;

a middleware engine in the resource sub-system having means for dynamically registering servers and allowing registered servers to be modified, added, or deleted, and said servers for both active and redundant resources register with the resource middleware engine to provide automatic redundancy;

reading a received message, determining a registered server associated with the function identified by the message, and activating the determined server;

means in each said registered server for controlling performance of the function to be carried out by the resource;

means in the resource middleware engine for passing control back to the proxy when the function is complete; and means in the requesting sub-system for terminating the proxy when the requesting application is satisfied.

2. The system as claimed in claim 1, wherein each middleware engine comprises means for operating as a requesting or as a resource middleware engine.

3. The system as claimed in claim 1, wherein the sub-systems comprise a main system controller and a plurality of line cards.

4. The system as claimed in claim 1, wherein the requesting application comprises means for creating the proxy and for terminating the proxy.

5. The system as claimed in claim 1, wherein the proxy is an instance of a proxy object class.

6. The system as claimed in claim 1, wherein the server is an instance of a server object class.

7. The system as claimed in claim 6, wherein the server is stored in non-volatile memory.

8. The system as claimed in claim 1, wherein the resource middleware engine is coupled to the resource only through the registered servers whereby the resource may be created or modified independently of the middleware engine.

9. The system as claimed in claim 8, wherein the servers register automatically with the resource middleware engine.

10. The system as claimed in claim 1, wherein the proxy controls one of a plurality of types of message transactions, including a synchronous type in which the function is invoked, a response is awaited and a return value is passed to the requesting application, and an asynchronous type in which the function is invoked without waiting for a response.

11. The system as claimed in claim 10, wherein the proxy controls a deferred synchronous transaction in which a function is invoked, a reply is transmitted and an application retrieves the reply later.

12. The system as claimed in claim 1, wherein the proxy initiates multiple re-tries upon failure of the requested function.

13. The telecommunication system comprising a requesting sub-system;

a resource sub-system; and a messaging system including means in a requesting sub-system for creating a proxy to control messaging for a function to be carried out in real time by a resource on a resource sub-system, the function being requested by an application on the requesting sub-system, said proxy creating means having means for including a logical key identifying a server type for a server to control implementation of the function;

a middleware engine in the requesting sub-system including means for acting in response to the proxy in real time to generate a function request message and to transmit said message to the resource sub-system, wherein the requesting middleware engine is coupled to the application only through the proxy, the message includes the logical key and function parameter arguments;

a middleware engine in the resource sub-system having means for dynamically registering servers and allowing registered servers to be modified, added, or deleted, and said servers for both active and redundant resources register with the resource middleware engine to provide automatic redundancy;

reading a received message, determining a register server associated with the function identified by the message, and activating the determined server;

means in each said registered server for controlling performance of the function to be carried out by the resource;

means in the resource middleware engine for passing control back to the proxy when the function is complete; and means in the requesting sub-system for terminating the proxy when the requesting application is satisfied.

* * * * *